United States Patent [19]

Bastiaansen et al.

[11] Patent Number: 5,128,415

[45] Date of Patent: Jul. 7, 1992

[54] PROCESS FOR PREPARING POLYETHYLENE ARTICLES OF HIGH TENSILE STRENGTH AND MODULUS AND LOW CREEP AND ARTICLES THUS OBTAINED

[75] Inventors: Cornelis W. M. Bastiaansen, Sittard, Netherlands; Yasuo Ohta; Hiroshige Sugiyama, both of Katata, Japan

[73] Assignee: Dyneema V.O.F., Sittard, Netherlands

[21] Appl. No.: 540,462

[22] PCT Filed: Oct. 27, 1987

[86] PCT No.: PCT/NL87/00029

§ 371 Date: Jun. 28, 1988

§ 102(e) Date: Jun. 28, 1988

[87] PCT Pub. No.: WO88/03184

PCT Pub. Date: May 5, 1988

Related U.S. Application Data

[63] Continuation of Ser. No. 224,918, Jun. 28, 1988, abandoned.

[30] Foreign Application Priority Data

Oct. 31, 1986 [NL] Netherlands ......................... 8602745
Aug. 4, 1987 [JP] Japan ............................... 62-194856

[51] Int. Cl.$^5$ ........................................... C08L 23/00
[52] U.S. Cl. .................................... 525/240; 264/205; 526/352

[58] Field of Search ..................... 264/210.2, 203–205, 264/184, 210.7, 210.8, 176.1, 323, 126; 524/529; 526/352; 525/240

[56] References Cited

U.S. PATENT DOCUMENTS

| | | | |
|---|---|---|---|
| 4,344,908 | 8/1982 | Smith et al. | 264/203 |
| 4,422,993 | 12/1983 | Smith et al. | 264/210.8 |
| 4,436,689 | 3/1984 | Smith et al. | 264/205 |
| 4,455,273 | 6/1984 | Harpell et al. | 264/210.8 |
| 4,536,536 | 8/1985 | Kavesh et al. | 264/184 |
| 4,551,296 | 11/1985 | Kavesh et al. | 264/204 |
| 4,643,865 | 2/1987 | Okada et al. | 264/204 |

FOREIGN PATENT DOCUMENTS

| | | | |
|---|---|---|---|
| 77590 | 4/1983 | European Pat. Off. | 264/210.8 |
| 8505316 | 12/1985 | European Pat. Off. | 264/205 |
| 8500429 | 4/1986 | Netherlands | 264/176.1 |
| 2051667A | 1/1981 | United Kingdom | 264/331.17 |
| 2164897A | 4/1986 | United Kingdom | 264/204 |

Primary Examiner—Jeffery Thurlow
Attorney, Agent, or Firm—Cushman, Darby and Cushman

[57] ABSTRACT

Polethylene articles having a high tensile strength above 2.0 GPa, a modulus above 70 GPa and a creep below $3 \times 10^{-7} \sec^{-1}$ are obtained via thermoreversible gelation of a solution of polyethylene with a Mv above $5 \times 10^5$ kg/kmole, followed by ultradrawing. As polyethylene a copolymer or a blend is used containing 2–20 lower alkyl side chains per 1000 carbon atoms.

4 Claims, No Drawings

PROCESS FOR PREPARING POLYETHYLENE ARTICLES OF HIGH TENSILE STRENGTH AND MODULUS AND LOW CREEP AND ARTICLES THUS OBTAINED

This is a continuation of application Ser. No. 07/224,918, filed on Jun. 28, 1988, which was abandoned upon the filing hereof.

The invention relates to a process for preparing articles, such as filaments, tapes, films, tubes, rods and profiles, from high molecular weight polyethylene, with a high tensile strength and a high modulus and low creep.

It is known to prepare articles of high tensile strength and modulus, in particular filaments or tapes, starting from solutions of high molecular weight polyethylene, see U.S. Pat. Nos. 4,344,908; 4,411,854; 4,422,993; 4,430,383 and 4,436,689. In these known processes, a semidilute solution of a linear, high molecular weight polyethylene is converted e.g., spinning to a solvent-containing article, e.g. a filament, which is subsequently converted to an article of high strength and modulus by thermoreversible gelation and drawing. As the strength and modulus of the articles made have been found to increase with increasing molecular weight of the polyethylene used, a polyethylene with a weight-average molecular weight of at least $4 \times 10^5$, in particular at least $6 \times 10^5$, and preferably above $1 \times 10^6$ will generally be started from.

Articles obtained with these known processes have been found to have a relatively high creep.

It has been attempted to lower the creep by for instance irradiation with electron rays. However it appeared that then the tensile strength of the articles strongly decreases. It is also described, see EP-A-205,960, to improve the creep resistance by post-stretching or heat treatment. However this does not appear to be a technical or economical solution due to the very slow stretching and complicated processing steps.

The present invention provides articles with a high modulus, a high tensile strength and low creep, and a process of preparing such articles.

The invention relates to a process for preparing polyethylene articles of high tensile strength, high modulus and low creep, in which a polyethylene feedstock with a viscosity-average molecular weight of at least 500,000 kg/kmole mixed with a solvent or a mixture of solvents for the polyethylene is converted to a shaped, solvent-containing article at a temperature above the dissolving point, this article is cooled to form a solid gel-like article, and this solid article obtained after cooling is drawn at an elevated temperature, whether or not after complete or partial removal of solvent this process being characterized in that a polyethylene feedstock is used which contains 2-20 alkyl side chains per 1000 carbon atoms.

According to one mode of realization of the present invention use is made of a polyethylene copolymer. In that case preferably, a polyethylene copolymer is used which has a viscosity-average molecular weight of more than $6 \times 10^5$, in particular more than $8 \times 10^5$ and more in particular more than $1 \times 10^6$ kg/kmole and which preferably contains 3-12 alkyl side chains per 1000 carbon atoms, which side chains preferably contain at most two carbon atoms.

According to another mode of realization of the present invention use is made of a blend of (A) a polyethylene containing less than 2 alkyl side chains per 1000 carbon atoms and
(B) a polyethylene containing at least 4 alkyl side chains per 1000 carbon atoms, both (A) and (B) having a visosity-average molecular weight of at least 500,000 Kg/Kmole.

In that case both component (A) and (B) have preferably a viscosity-average molecular weight of more than $6 \times 10^5$, in particular more than $8 \times 10^5$ and more in particular $1 \times 10^6$ Kg/Kmole, while the blend of (A) and (B) preferably contains 2.5-10 and more preferably 4-7 alkyl side chains per 1000 carbon atoms, which side chains preferably contain at most two carbon atoms.

It has been found that when the side chains are too long, e.g. 5, 6 or more carbon atoms, the decrease in creep diminished and moreover also the tensile strength and modulus decrease. If a blend of polyethylene is used the amount of side chains in the component with the highest amount of side chains must be below 100, preferably below 20 per 1000 carbon atoms.

The invention further relates to articles with decreased creep, with a modulus of at least 70 GPa and a tensile strength of at least 2.0 GPa, consisting of an ethylene polymer with a viscosity-average molecular weight of at least 500,000 kg/kmole, which contains 2-20 side chains per 1000 carbon atoms, which side chains are methyl or ethyl groups. It has been found that the articles according to the invention have a plateau creep rate, as defined in Polymer Vol. 19, Aug. 1978, p. 969 (by Wilding, M. A. et al.), which is 10-100 times lower than that of articles from a similar polyethylene with virtually no side chains.

The invention particularly relates to polyethylene articles having a creep rate of at most $3 \times 10^{-7}$ sec$^{-1}$ (measured at 50° C. with a load of 0.75 GPa), preferably at most $2 \times 10^{-7}$ sec$^{-1}$, and more preferably not more than $1 \times 10^{-7}$ sec$^{-1}$, while the tensile strength amounts particularly to above 2.5 GPa, preferably at least 3 GPa, and the modulus to above 80 GPa. Particularly in the articles according to the invention the "a" axis of the crystal unit cell measured by a wide angle X-ray at 20° C and a humidity of 65% is not less than 7.45 Å. Preferably the articles are in the form of filaments tapes or films.

With the process of the present invention, various solvents can be employed. Suitable solvents are, for example, halogenated or non-halogenated hydrocarbons, such as paraffins, paraffinic waxes, toluene, xylene, tetralin, decalin, monochlorobenzene, nonane, decane or mineral oil fractions. Obviously, also mixtures of solvents can be used.

The polyethylene concentration in the solution may vary, depending on the nature of the solvent and the molecular weight of the polyethylene. Especially when polyethylene with a very high molecular weight is used, for example more than $2 \times 10^6$, solutions with a concentration of more than 50 wt. % are rather difficult to handle on account of the high viscosity that occurs. On the other hand, using solutions with a concentration of, for example, less than 0.5 wt. % is disadvantageous in that the yield is lower and the cost of solvent separation and recovery higher. In general, therefore, a polyethylene solution with a concentration of between 1 and 50 wt. %, in particular 3-35 wt. %, will be used.

The solutions to be used can be prepared in various ways, for example by suspending solid polyethylene in the solvent followed by stirring at an elevated temperature, or by converting the suspension with the aid of a twin-screw extruder equipped with mixing and conveying parts.

With the present invention, the conversion of the solution to a shaped, solvent-containing article can be carried out in various ways, for example by spinning via a spinneret with a round or slit-shaped die to obtain a filament or a tape, respectively, or extrusion with an extruder, usually with a profiled die.

The temperature during conversion should be chosen above the dissolving point. This dissolving point depends, of course, on the solvent chosen, the concentration, the molar weight and chemical composition of the polyethylene and the pressure applied, and is preferably at least 90° C, in particular at least 100° C. Of course, this temperature is chosen below the decomposition temperature of the polyethylene.

If desired, the solvent-containing article can be drawn before cooling, for example with a draw ratio of 2-20.

The process according to the invention involves the cooling of the shaped, solvent-containing article to below the gel point, in such a way that virtually no solvent is removed, applying fast cooling, preferably with air and/or a liquid quenching medium, for example water. The gel point depends in part on the solvent, of course, and in general virtually coincides with the aforementioned dissolving point. Preferably, the article is cooled to about ambient temperature.

The article thus obtained can subsequently be drawn. However, it is also possible to remove at least a portion of the solvent before drawing, for example by extraction with, for example, dichloroethane. Of course, it is also possible to perform the drawing operation under such conditions that all or a portion of the solvent still present is removed, for example by passing a gas through or by performing the drawing operation in an extracting agent.

In the process of the invention, the articles are drawn at an elevated temperature, e.g. above the glass transition temperature and below the decomposition temperature of the polyethylene. Preferably, the drawing operation is performed above 75° C. This drawing is preferably carried out in several steps at increasing temperatures.

It has been found that in the process of the invention high draw ratios can be applied. In general, a draw ratio of at least 10, preferably at least 20, and in particular at least 40 is applied. Of course the draw ratio can be lower, if a high drawing is applied before cooling.

The articles according to the invention are suitable for virtually all technical applications where strength and stiffness are required and where weight saving is advantageous.

If desired, minor amounts of additives, stabilizers and the like can be applied in or on the articles.

The invention will be elucidated in the following examples, without being restricted thereto.

Each characteristic value used herein was determined by the following method.

VISCOSITY AVERAGE MOLECULAR WEIGHT

According to ASTM D 2857, an intrinsic viscosity ($\eta$) was determined based on dependence of viscosity of a concentration of a decalin solution at 135° C. The ($\eta$) was used in the following formula to calculate a viscosity average molecular weight. $Mv = 3.64 \times 10^4 \times (\eta)1.39$

MEASUREMENT OF STRENGTH AND ELONGATION

The measurement was carried out according to JIS-1013. That is, a S-S curve was determined by using Tensilon manufactured by Toyo Bouldwin Company under the conditions of the sample length of 200 mm and the elongation rate of 100 mm/min to calculate a tensile strength and a tensile modulus. The tensile modulus was calculated from the maximum incline about the origin of the S-S curve.

KINDS AND AMOUNTS OF SIDE CHAINS

Polyethylene powder or a finely pulverized molded article was dissolved in o-dichlorobenzene at 120° C so that a 10% by weight solution was obtained. The $^{13}C$ NMR spectrum at 75 MHz of this solution was observed at 120° C. The identification of the signals was made with reference to Makromol. Chem. 184, 569 (1983). Further, a degree of branching was expressed by the ratio of intensity of a peak derived from branching points to that of methylene peak of the main chain.

SIZE OF "A" AXIS OF CRYSTAL UNIT CELL

Determination of a wide angle X-ray scattering pattern is carried out by using, for example, a X-ray generator (RU-3H type) manufacture by Rigaku Denki Company. For measurement, there is used a copper pair electrode Cu K$\alpha$ $\alpha = 1.5418$ Å) of a tube voltage 45 kv and a tube current of 70 mA which is monochromatized with a nickel filter. A filament sample is attached to a sample holder in such a manner that monofilaments are in parallel with each other. Preferably, its thickness is 0.5 to 1.0 mm. A wide angle X-ray diffraction pattern is obtained by arranging the fiber axis of the filaments in parallel with each other so that it is oriented to the meridional direction and, size of the "a" axis of a crystal unit cell can be calculated based on the scattering angle 2a at the diffraction peak position of the face (200) of the equatorial diffraction curve according to the following formula.

$$a = 2 \times \frac{\lambda}{2\sin\alpha} \text{ (Å)}$$

$$\lambda = 1.5417 \text{Å}$$

(as to correction of the scattering angle and other details, for example, "X-sen Kessho Gaku", Isamu Nida ed., published by Maruzen Kabishiki Kaisha can be referred to.)

CREEP RATE

The creep rate used herein means a deformation rate at a stage where the rate of change of elongation to time after applying a load to a sample becomes constant or, at least, the rate of change becomes the minimum, i.e., at plateau creep as shown, for example, by Journal of Polymer Science, 22, 561 (1984). When a length of the sample at a certain time (t sec) is represented by l(t) (cm), the creep rate can be calculated by the following formula $$\text{Creep rate} = \frac{l(t + a) - l(t)}{l \cdot a} \text{ (sec}^{-1}\text{)}$$

wherein $l_0$ is the length (cm) of the sample without applying a load; and a is an optional very short period of time (sec).

EXAMPLE I

A polyethylene with an Mv of about $1.6 \times 10^6$ kg/kmole, containing about 10 methyl side groups per 1000 C atoms, was suspended in xylene to a nominal concentration of 2 wt. % and, after addition of a stabilizer package and deaeration, dissolved at 130° C. Next, the solution was poured into stainless steel containers and quenched. The solvent was evaporated at room temperature and solvent residues were extracted with dichloroethane. The dry gel films obtained were cut and, at a temperature gradient of 110°-130° C, were drawn in a number of steps to a draw ratio of 60. The drawn tapes had an E-modulus of 85 GPa, a tensile strength of 2.0 GPa and a plateau creep rate ($\epsilon$) at room temperature and at a load of 0.9 GPa of $10^{-8}$ sec$^{-1}$.

EXAMPLE II

The procedure of Example I was repeated, but with a polyethylene with an Mv of about $1.5 \times 10^6$ kg/kmole, which had 4 methyl side groups per 1000 C-atoms. The tapes obtained had an E-modulus of 88 GPa, a tensile strength of 2.1 GPa and a plateau creep rate of $3 \times 10^{-8}$ sec$^{-1}$.

COMPARATIVE EXAMPLE A

The process of Examples I and II was repeated, but with a polyethylene with an Mv of about $1.4 \times 10^6$ kg/kmole and 1 methyl side group per 1000 C-atoms. The tapes obtained had an E-modulus of 90 GPa, a tensile strength of 2.2 GPa and a plateau creep rate of $8 \times 10^{-7}$ sec$^{-1}$.

EXAMPLE III

A polyethylene as described in Example I was suspended in decalin to a nominal concentration of 10 wt. % at room temperature. After deaeration, washing with nitrogen and addition of a stabilizer, the suspension was with stirring fed to a co-rotating twin screw extruder (ZSK type from Werner and Pfleiderer; diameter 30 mm; L/D ratio=27). This extruder was equipped with $2 \times 30$ mm screws, consisting of alternate conveying and kneading elements.

At room temperature, the suspension was fed to the intake zone (80° C) and extruded at 180° C at a screw speed of 200 rpm, the residence time being 3 minutes.

The solution obtained was spun, cooled in water and extracted in dichloromethane, followed by drawing of the gel filaments at 120° C and a drawn ratio of 30.

The filaments obtained had an E-modulus of 95 GPa, a tensile strength of 2.7 GPa and a plateau creep rate of $5 \times 10^{-8}$ sec$^{-1}$ at 50° C and a load of 0.6 GPa.

COMPARATIVE EXAMPLE B

The process of Example III was repeated, but with a polyethylene with an Mv of $1.6 \times 10^6$ kg/kmole and less than 1 methyl side group per 1000 C-atoms.

The filaments obtained had an E-modulus of 110 GPa, a tensile strength of 3 GPa and a plateau creep rate of $10^{-6}$ sec$^{-1}$.

EXAMPLE IV

Powders of a polyethylene (A) having an Mv of $1.9 \times 10^6$ and 1.2 methyl side chains per 1000 carbon atoms of the main chain as determined by a high resolving power NMR, and a polyethylene (B) having an Mv of $1.9 \times 10^6$ and 13.0 methyl side chains per 1000 carbon atoms of the main chain as determined by the same NMR were blended in the weight ratio of 10:90. Then, decalin (90 parts by weight) was admixed with this blend (10 parts by weight) to form a slurry stock. The stock was kneaded and melted with a twin screw extruder having a temperature of 230° C to extrude a clear and uniform dissolved material from an orifice having 0.5 mm diameter.

The extruded dissolved material was drawn down at a draw-down rate of 30 m/min. with cooling in air flow and then stretched at the draw ratio of 5 times in an air heating oven. Accordingly, the take-up rate of the intermediate stretched material was 150 m/min. Then, the material was stretched at the maximum draw ratio of 3.2 times (therefore, the total draw ratio was 16.0 times) with an oven having 50 m in length under heating atmosphere. The stretching take-up rate of this stage was 100 m/min.

EXAMPLES V, VI, VII, VIII AND COMPARATIVE EXAMPLES C AND D

By using the same polymers as described in Example IV and according to the same manner and conditions as described in Example IV, filaments were prepared except that the polymer blend ratio of the branched polymer (B) to the polymer (A) was changed as shown in Table 1 and the maximum draw ratio of the two stage stretching was changed as shown in Table 1 with respect to each Example (the final take-up rate was constant at 100 m/min). Thus, there was difference between resulting strength of the end molded article.

TABLE 1

| Example | Polymer | Blend ratio | Max. draw ratio |
|---|---|---|---|
| IV | (A) and (B) | (A):(B) = 10:90 | 16.0 |
| V | (A) and (B) | (A):(B) = 25:75 | 17.5 |
| VI | (A) and (B) | (A):(B) = 50:50 | 20.0 |
| VII | (A) and (B) | (A):(B) = 75:25 | 22.5 |
| VIII | (A) and (B) | (A):(B) = 90:10 | 24.0 |
| C | (A) | (A) = 100 | 24.0 |
| D | (B) | (B) = 100 | 10.0 |

In Table 2, there are shown the maximum resulting strength of the articles obtained in Examples and Comparative Examples and the creep rate at that time measured at 50° C with a load of 0.75 GPa. In each Example, the article shows excellent high properties and superior creep resistance. Particularly, in the case of Example VI, about 1/20 creep resistance is shown in comparison with that of Comparative Example C. Although creep is low when using 100% of a branched polymer as shown in Comparative Example D, high tenacity filaments can not be obtained.

TABLE 2

| Example | Tensile strength (GPa) | Amount of side chains (per 1000 C.) | Creep rate (sec$^{-1}$) | Tensile modulus GPa |
|---|---|---|---|---|
| IV | 2.1 | 11.7 | $3.0 \times 10^{-7}$ | 68.0 |
| V | 2.8 | 10.1 | $1.0 \times 10^{-7}$ | 100.0 |
| VI | 3.1 | 7.1 | $6.0 \times 10^{-8}$ | 104.5 |
| VII | 3.2 | 3.9 | $1.1 \times 10^{-7}$ | 110.0 |
| VIII | 3.3 | 2.4 | $2.6 \times 10^{-7}$ | 113.6 |
| C | 3.45 | 1.2 | $1.2 \times 10^{-6}$ | 118.6 |
| D | 1.55 | 13.0 | $5.0 \times 10^{-7}$ | 59.0 |

We claim:

1. Polyethylene articles with a modulus of at least 70 GPa, tensile strength of at least 2.0 GPa and a plateau creep rate of less than $3.0 \times 10^{-7} \sec^{-1}$, said polyethylene article being a blend of (A) polyethylene containing less than 2 alkyl side chains per 1000 carbon atoms and (B) polyethylene containing at least 4 alkyl side chains per 1000 carbon atoms, said article being produced by a process in which a polyethylene feedstock with a viscosity-average molecular weight of at least 500,000 kg/kmole mixed with a solvent or a mixture of solvents for the polyethylene is converted to a shaped, solvent-containing article at a temperature above the dissolving point, this article is cooled to form a solid gel-like article, and this solid article obtained after cooling is drawn at an elevated temperature, whether or not after complete or partial removal of solvent, wherein a polyethylene feedstock is used which is a blend of (A) polyethylene containing less than 2 alkyl side chains per 1000 carbon atoms and
(B) polyethylene containing at least 4 alkyl side chains per 1000 carbon atoms, both (A) and (B) having a viscosity-average molecular weight of at least 500,000 kg/kmole provided that the blend of feedstock polyethylenes contains 2-20 alkyl side chains per 1000 carbon atoms, the side chains containing 1-4 carbon atoms.

2. Article according to claim 1, wherein the blend contains 2.5-10 alkyl side chains per 1000 carbon atoms.

3. Article according to claim 1, wherein the blend alkyl side chains contain at most 2 carbon atoms.

4. Articles according to claim 1, wherein an "a" axis of the crystal unit cell of the article measured by a wide angle X-ray at 20° C and a humidity of 65% is at least 7.45 Å.

* * * * *